United States Patent
Davis et al.

(10) Patent No.: US 10,451,348 B2
(45) Date of Patent: Oct. 22, 2019

(54) SMELTING PROCESS AND APPARATUS

(71) Applicant: Tata Steel Limited, Mumbai (IN)

(72) Inventors: Mark Preston Davis, West Shelley (AU); Jacques Pilote, Woodlands (AU)

(73) Assignee: Tata Steel Limited, Mumbai (IN)

( * ) Notice: Subject to any disclaimer, the term of this patent is extended or adjusted under 35 U.S.C. 154(b) by 136 days.

(21) Appl. No.: 15/039,456

(22) PCT Filed: Dec. 4, 2014

(86) PCT No.: PCT/AU2014/001098
§ 371 (c)(1),
(2) Date: May 26, 2016

(87) PCT Pub. No.: WO2015/081376
PCT Pub. Date: Jun. 11, 2015

(65) Prior Publication Data
US 2017/0176104 A1    Jun. 22, 2017

(30) Foreign Application Priority Data

Dec. 6, 2013  (AU) ................................ 2013904748

(51) Int. Cl.
| | |
|---|---|
| F27D 1/12 | (2006.01) |
| F27B 3/24 | (2006.01) |
| F27D 9/00 | (2006.01) |
| C21C 5/46 | (2006.01) |
| C21C 5/52 | (2006.01) |
| C21C 5/54 | (2006.01) |

(Continued)

(52) U.S. Cl.
CPC .............. *F27D 1/12* (2013.01); *C21C 5/46* (2013.01); *C21C 5/5241* (2013.01); *C21C 5/54* (2013.01); *C21C 7/076* (2013.01); *F27B 1/14* (2013.01); *F27B 3/24* (2013.01); *F27D 9/00* (2013.01); *Y02P 10/242* (2015.11); *Y02P 10/253* (2015.11)

(58) Field of Classification Search
CPC ................. F27D 1/12; F27D 9/00; F27B 3/24
USPC ......................................................... 266/193
See application file for complete search history.

(56) References Cited

U.S. PATENT DOCUMENTS

| | | | |
|---|---|---|---|
| 4,235,173 A * | 11/1980 | Sharp .................... | C21C 5/4606 110/336 |
| 2008/0111287 A1* | 5/2008 | Pyne ........................ | C21B 7/10 266/190 |

(Continued)

FOREIGN PATENT DOCUMENTS

| | | |
|---|---|---|
| EP | 1170385 A2 | 1/2002 |
| WO | 00/01854 A1 | 1/2000 |

(Continued)

OTHER PUBLICATIONS

Dec. 19, 2014—International Search Report of PCT/AU2014/0001098.
Jan. 19, 2016—Written Opinion of the IPER for PCT/AU2014/0001098.

*Primary Examiner* — Scott R Kastler
(74) *Attorney, Agent, or Firm* — Banner & Witcoff, Ltd.

(57) ABSTRACT

A smelting vessel (4) for producing molten metal includes a refractory lined hearth that in use is in contact with molten slag or molten metal in the smelting vessel, and the hearth includes a plurality of heat pipes (2.1) positioned in a refractory lining of at least a part of the hearth for cooling the refractory lining.

16 Claims, 7 Drawing Sheets

(51) Int. Cl.
*C21C 7/076* (2006.01)
*F27B 1/14* (2006.01)

(56) References Cited

U.S. PATENT DOCUMENTS

2015/0084246 A1* 3/2015 Tang .................. F27D 9/00
  266/46
2017/0176104 A1* 6/2017 Davis .................. C21C 5/46

FOREIGN PATENT DOCUMENTS

| WO | 00/022176 A1 | 4/2000 |
| WO | 2007/134382 A1 | 11/2007 |

* cited by examiner

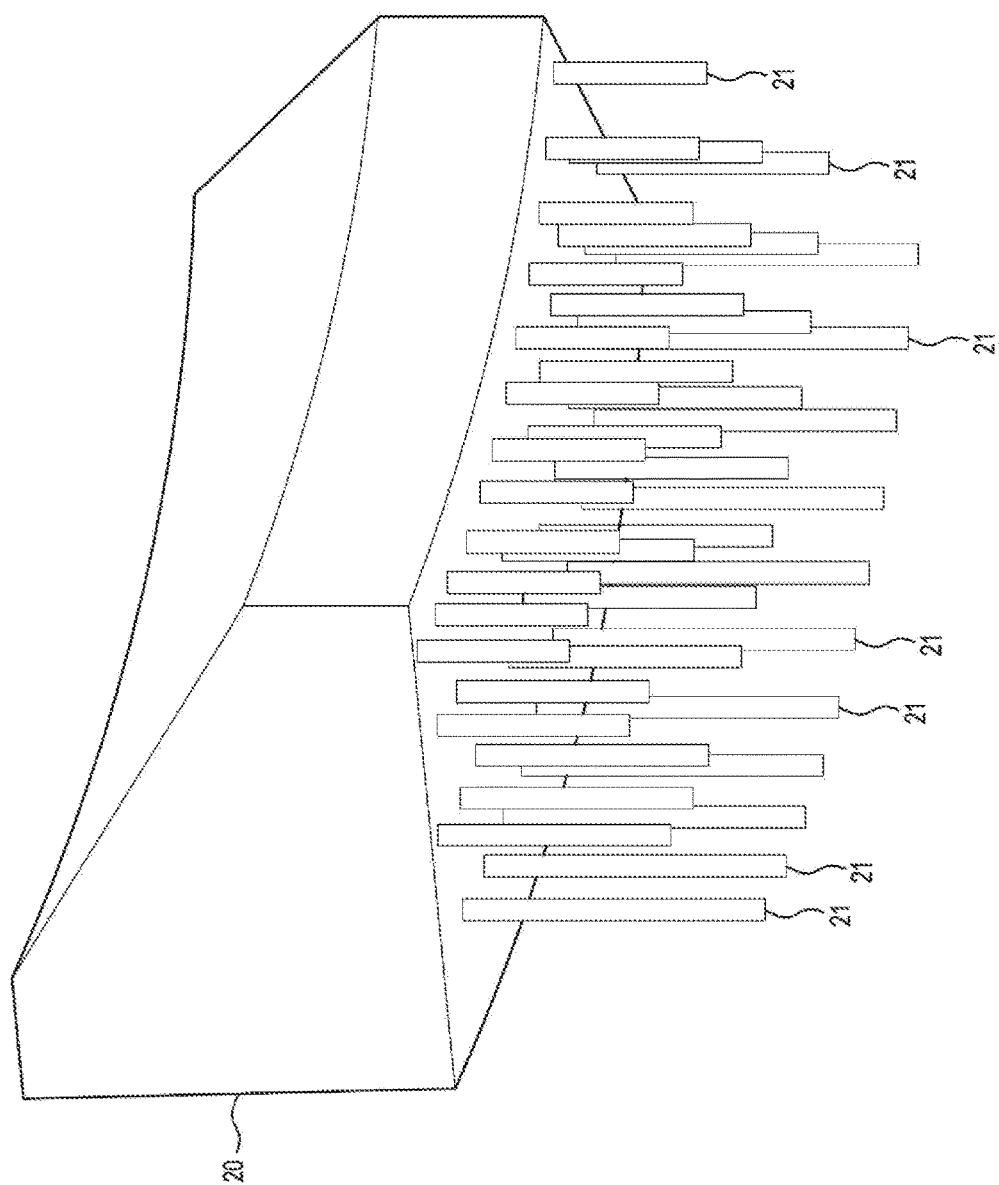

SMELTING PROCESS AND APPARATUS

CROSS-REFERENCE TO RELATED APPLICATIONS

The present application is a U,S. National Phase filing of International Application No. PCT/AU2014/001098, filed on Dec. 4, 2014, designating the United States of America and claiming priority to Australian Patent Application No. 2013904748 filed Dec. , 2013. The present application claims priority to and the benefit of all the above-identified applications, which are all incorporated by reference herein in their entireties.

TECHNICAL FIELD

The present invention relates to a process and an apparatus for smelting a metalliferous material.

In particular, although by no means exclusively, the present invention relates to a smelting process and apparatus for smelting an iron-containing material, such as an iron ore, and producing iron.

The present invention also relates to other smelting processes and apparatus including, by way of example only, processes and apparatus for smelting titania slag and smelting copper-containing material.

BACKGROUND

There are a number of known molten bath-based smelting processes.

One molten bath-based smelting process that is generally referred to as the "HIsmelt" process is described in a considerable number of patents and patent applications in the name of the applicant. Another molten bath-based smelting process is referred to hereinafter as the "HIsarna" process. The HIsarna process and apparatus are described in International application PCT/AU99/00884 (WO 00/022176) in the name of the applicant. Other known molten bath-based smelting processes include by way of example only, processes for smelting titania slag and for smelting copper-containing material.

The following description of the invention focuses on the HIsmelt and the HIsarna processes.

The HIsmelt and the HIsarna processes are associated particularly with producing molten iron from iron ore or another iron-containing material.

In the context of producing molten iron, the HIsmelt process includes the steps of:

(a) forming a bath of molten iron and molten slag in a smelting chamber of a smelting vessel;

(b) injecting into the bath: (i) iron ore, typically in the form of fines; and (ii) a solid carbonaceous Material, typically coal, which acts as a reductant of the iron ore feed material and a source of energy; and (c) smelting iron ore to iron in the bath.

The term "smelting" is herein understood to mean thermal processing wherein chemical reactions that reduce metal oxides take place to produce molten metal.

In the HIsmelt process solid feed materials in the form of metalliferous material and solid carbonaceous material care injected with a carrier gas into the molten bath through a number of lances which are whited to the vertical so as to extend downwardly and inwardly through the side wall of the smelting, vessel and into a lower region of the vessel so as to deliver at least part of the solid feed materials into the metal layer in the bottom of the smelting chamber. The solid feed materials and the carrier gas penetrate the molten bath and cause molten metal and/or slag to be projected into a space above the surface of the bath and brat a transition zone. A blast of oxygen-containing gas, typically oxygen-enriched air or pure oxygen, is injected into an upper region of the smelting chamber of the vessel through a downwardly extending lance to cause post-combustion of reaction gases released from the molten bath in the upper region of the vessel. In the transition zone there is a favourable mass of ascending and thereafter descending droplets or splashes or streams of molten metal and/or slag which provide an effective medium to transfer to the bath the thermal energy generated by post-combusting reaction gases above the bath.

Typically, in the case of producing molten iron, when oxygen-enriched air is used, it is fed at a temperature of the order of 1200° C. and is generated in hot blast stoves. If technically pure cold oxygen is used, it is typically fed at or close to ambient temperature.

Off-gases resulting from the post combustion of reaction gases in the smelting vessel are taken away from the upper region of the smelting vessel through an off-gas duct.

The smelting vessel includes refractory-lined sections in the lower hearth and water cooled panels in the side wall and the roof of the vessel, and water is circulated continuously through the panels in a continuous circuit.

The HIsmelt process enables large quantities of molten iron, typically at least 0.5 Mt/a, to be produced by smelting in a single compact vessel.

The HIsarna process is carried out in a smelting apparatus that includes (a) a smelting vessel that includes a smelting chamber and lances for injecting solid feed materials and oxygen-containing gas into the smelting chamber and is adapted to contain a bath of molten metal and slag and (b) a smelt cyclone for pre-treating a metalliferous feed material that is positioned above and communicates directly with the smelting vessel.

The term "smelt cyclone" is understood herein to mean a vessel that typically defines a vertical cylindrical chamber and is constructed so that teed materials supplied to the chamber move in a path around a vertical central axis of the chamber and can withstand high operating temperatures sufficient to at least partially melt metalliferous feed materials.

In one form of the HIsarna process, carbonaceous feed material (typically coal) and optionally flux (typically calcined limestone) are injected into a molten bath in the smelting chamber of the smelting vessel. The carbonaceous material is provided as a source of a reductant and a source of energy. Metalliferous feed material, such as iron ore, optionally blended with flux, is injected into and heated and partially melted and partially reduced in the smelt cyclone. This molten, partly reduced metalliferous material flows downwardly from the smelt cyclone into the molten bath in the smelting vessel and is smelted to molten metal in the bath. Hot reaction gases (typically $CO$, $CO_2$, $H_2$, and $H_2O$) produced in the molten bath are partially combusted by oxygen-containing gas (typically technical-grade oxygen) in an upper part of the smelting chamber. Heat generated by the post-combustion is transferred to molten droplets in the upper section that back into the molten bath to maintain the temperature of the bath. The hot, partially-combusted reaction gases flow upwardly from the smelting chamber and enter the bottom of the smelt cyclone. Oxygen-containing gas (typically technical-grade oxygen) is injected into the smelt cyclone via tuyeres that are arranged in such a way as to generate a cyclonic swirl pattern in a horizontal plane, i e. about a vertical central axis of the chamber of the smelt cyclone. This injection of oxygen-containing gas leads to further combustion of smelting vessel as resulting M very hot (cyclonic) flames. Incoming metalliferous feed material, typically in the form of fines, is injected pneumatically into these flames via tuyeres in the smelt cyclone, resulting in rapid heating and partial melting accompanied by partial reduction (roughly 10-20% reduction). The reduction is due to both thermal decomposition of hematite and the reducing action of $CO/H_2$ in the reaction gases from the smelting chamber. The hot, partially melted metalliferous feed material is thrown outwards onto the walls of the smelt cyclone by cyclonic swirl action and, as described above, flows downwardly into the smelting vessel below for smelting in the smelting chamber of that vessel.

The net effect of the above-described form of the HIsarna process is a two-step countercurrent process. Metalliferous feed material is heated and partially reduced by outgoing reaction gases from the smelting vessel (with oxygen-containing gas addition) and flows downwardly into the smelting vessel and is smelted to molten iron in smelting chamber of the smelting vessel. In a general sense, this countercurrent arrangement increases productivity and energy efficiency.

The HIsmelt and the HIsarna processes include solids injection into molten baths in smelting vessels via water-cooled solids injection lances.

A key feature of both processes is that the processes operate in a smelting vessel that includes a smelting chamber for smelting metalliferous material and a forehearth connected to the smelting chamber via a forehearth connection that allows continuous metal product outflow from the vessels. A forehearth operates as a molten metal-filled siphon seal, naturally "spilling" excess molten metal from the smelting vessel as it is produced. This allows the molten metal level in the smelting chamber of the smelting vessel to be known and controlled to within a small tolerance—this is essential for plant safety. The molten metal level must (at all times) be kept at a safe distance below water-cooled elements such as solids injection lances extending into the smelting chamber, otherwise steam explosions become possible. It is fir this reason that the forehearth is considered to be an inherent part of a smelting vessel for the HIsmelt and the HIsarna processes.

The term "forehearth" is understood herein to mean a chamber of a smelting vessel that is open to the atmosphere and is connected to a smelting chamber of the smelting vessel via a passageway (referred to herein as a "forehearth connections") and, under standard operating conditions, contains molten metal in the chamber, with the forehearth connection being completely filled with molten metal.

International publication WO 00/01854 in the name of the applicant describes that a direct smelting vessel that is an example of a vessel that can be used in the HIsmelt and the HIsarna processes and comprises a hearth formed of refractory material and side walls extending upwardly from the sides of the hearth, with the side wall including water cooled panels. The HIsmelt and the HIsarna processes are highly agitated and this results in refractory wear of the upper part of the hearth due to chemical attack and physical wear by molten slag and molten metal washing and splashing against the refractory material in the upper part of the hearth. This wear is greater than is typically experienced in the hearths of blast furnaces in which the hot metal and slag is relatively quiescent.

The present invention enables a significant reduction of such refractory wear of the hearth.

The above description is not to be taken as an admission of the common general knowledge in Australia or elsewhere.

SUMMARY OF THE DISCLOSURE

The present invention is based on a realisation that heat pipes, as described herein, positioned in a refractory-lined hearth of a smelting vessel, such as by way of example only a direct smelting vessel for the HIsmelt and HIsarna processes, can significantly reduce refractory wear of the refractory material of the hearth due to contact with molten material in the form of molten slag or molten metal and make it possible to use a wider range of refractory materials in the hearth than was previously the case and obtain operational benefits as a consequence of the wider materials selection.

In broad terms, the present invention provides a smelting vessel for producing molten metal including a refractory lined hearth that in use is in contact with molten slag or molten metal in the vessel, with the hearth including a plurality of heat pipes positioned in a refractory lining of at least a part of the hearth for cooling the refractory lining.

The term "heat pipe" is understood herein to mean, a scaled elongate tube that transfers heat without direct conduction as the main mechanism, using a fluid that vaporizes at a hot end of the tube and condenses at a colder end of the tube and thereby releases heat and returns to the hot end.

The heat pipes may be positioned so that they do not extend out of the smelting vessel.

The refractory lined hearth may include an upper part that in use is in contact with molten slag in a slag one in the vessel and a lower part that in use is in contact with molten metal in a metal zone in the vessel.

The heat pipes may be positioned in the refractory g of the upper past of hearth for cooling the refractory lining.

The heat pipes may be any suitable shape.

The heat pipes may include lower sections that are arranged to extend vertically in the refractory lining.

The lower sections may be straight sections.

The lower sections may be shaped, for example curved, having regard to the geometry of the hearth.

The lower sections of the heat pipes may be parallel to each other.

The lower sections of the heat: pipes may be spaced apart from each other.

The spacing of the lower sections of the heat pipes may be the same.

The spacing of the lower sections of the heat pipes may be different.

The spacing of the lower sections of the heat pipes may be the same in one section of the hearth and different in another section of the hearth.

For example, there may be relatively more heat pipes in areas that need more cooling. By way of example, a slag drain tap hole area may require additional cooling.

There are a number of factors that are relevant to the selection of the spacing of the heat pipes including, by way of example, the positions of the heat pipes, the amount of heat to be extracted from the refractory material, the thermal conductivity and other relevant characteristics of the refractory material, and the thermal conductivity of the heat pipes.

The heat pipes may be positioned completely around the hearth.

The heat pipes may be positioned in a ring completely around the hearth.

The heat pipes may be positioned in a plurality of radially spaced-apart rings completely around the hearth.

The heat pipes of one ring may be staggered circumferentially with respect to the heat pipes of a radially outward or radially inward ring.

The heat pipes may be the same length.

The heat pipes may be different lengths.

The length of the heat, pipes may increase with radial spacing of the heat pipes from an inner surface of the hearth in which the heat pipes are located.

The refractory lining of the hearth in which the heat pipes are located may have a cylindrical inner surface prior to the commencement of a smelting campaign in the vessel.

The vessel may include a slag zone cooler positioned in the refractory lining of the hearth for cooling the refractory lining, with the heat pipes being positioned below the slag zone cooler, with upper sections of the heat pipes being in heat transfer relationship with the slag zone cooler for transferring heat from the heat pipes to the slag zone cooler.

The slag zone cooler may be of the type described in International publication WO 2007/134182 in the name of the applicant.

The slag zone cooler may be formed as a ring by a plurality of cooler elements.

Each cooler element may be shaped as a segment of the ring, with the side walls extending radially of the ring.

Each cooler element may comprise a hollow open backed cast shell structure having a base wall, a pair of side walls, a front wall and a top wall formed integrally in the cast shell, structure and incorporating coolant flow passages for flow of coolant therethrough.

The heat pipes may include upper sections that are arranged to extend, radially in the vicinity of the slag zone cooler to maximize heat transfer to the slag zone cooler.

By way of example, the heat pipes may be generally upside-down L-shaped or hockey-stick shaped with vertically extending lower sections and radially or generally radially extending, upper sections.

The vessel may include side walls extending upwardly from the hearth and a plurality of cooling panels positioned around the side walls so as to tort an interior lining on those side walls.

The vessel may include a device for tapping molten metals and a device for tapping slag from the vessel, one or more than one lance for supplying solid feed materials including solid metalliferous material and/or carbonaceous material into the vessel, and on or more than one lance for supplying an oxygen-containing gas into the vessel to post-combust gaseous reaction products generated in the direct smelting process.

The device for tapping molten metal may be a forehearth.

The vessel may include a smelt cyclone for partially reducing and partially melting solid metalliferous material for the vessel positioned above the vessel.

The vessel may be adapted, by way of example, for producing iron-containing alloys by a molten bath-based direct smelting process.

According to the invention there is provided an assembly of (a) a slag zone cooler element for cooling a part of a refractory lining of a hearth of a smelting vessel and (b) heat pipes in heat transfer relationship with the slag zone cooler for transferring heat from the heat pipes to the slag zone cooler.

In use, a plurality of the assemblies may be formed as a ring within the hearth of the smelting vessel.

Each cooler element may be shaped as a segment of the ring, with the side walls extending radially.

Each cooler clement may comprise a hollow open backed cast shell structure having a base wall, a pair of side walls, a front wall and a top wall formed integrally in the cast shell structure and incorporating coolant flow passages for flow of coolant therethrough.

According to the invention there is provided a smelting vessel for producing molten metal including a refractory lined hearth having an upper part that in use is in contact with slag in to slag zone in the vessel and a lower part that in use is in contact with molten metal in a metal zone in the vessel, the hearth including (a) a slag zone cooler positioned in a refractory lining of the upper part of the hearth for cooling the refractory lining and (b) as plurality of heat pipes positioned in the refractory lining of the upper part of the hearth below the slag zone cooler for cooling the refractory lining, with upper sections of the heat pipes being in heat transfer relationship with the slag zone cooler for transferring heat from the heat pipes to the slag zone cooler and lower sections extending downwardly within the upper part of the hearth from the slag zone cooler.

The slag zone cooler and the heat pipes may be formed as a assembly of these two components.

According to the invention there is provided a process for smelting a metalliferous feed material including smelting the metalliferous feed material in a molten bath in the above-described smelting vessel.

The process may include (a) at least partially reducing and partially melting the metalliferous feed material in a smelt cyclone and (b) completely smelting the at least partially reduced/melted material in the molten bath of the above-described smelting vessel.

The metalliferous feed material may be any material that contains metal oxides.

The metalliferous feed material may be ores, partly reduced ores and metal containing waste streams.

The metalliferous feed material may be an iron-containing feed material, such as an iron ore. In that event, the process may be characterized by maintaining a temperature of at least 1100° C., typically at least 1200° C. in the smelt cyclone.

The metalliferous feed material may be a titania slag.

The metalliferous feed material may be a copper-containing feed material.

The process may include maintaining the oxygen potential in the smelt cyclone that is sufficient so that the offgas from the smelt cyclone has a post combustion degree of at least 80%, According to the present invention there is also provided an apparatus for smelting metalliferous feed material that includes the above described smelting vessel.

BRIEF DESCRIPTION OF THE DRAWINGS

The present invention is described further by way of example with reference to the accompanying drawings, of which:

FIG. 3 is a schematic perspective view that illustrates a segment of an upper of the hearth of the vessel shown in FIG. 2 with the refractory material removed to show the slag zone cooler and the heat pipes of the embodiment;

DESCRIPTION OF EMBODIMENTS

Figure 1:
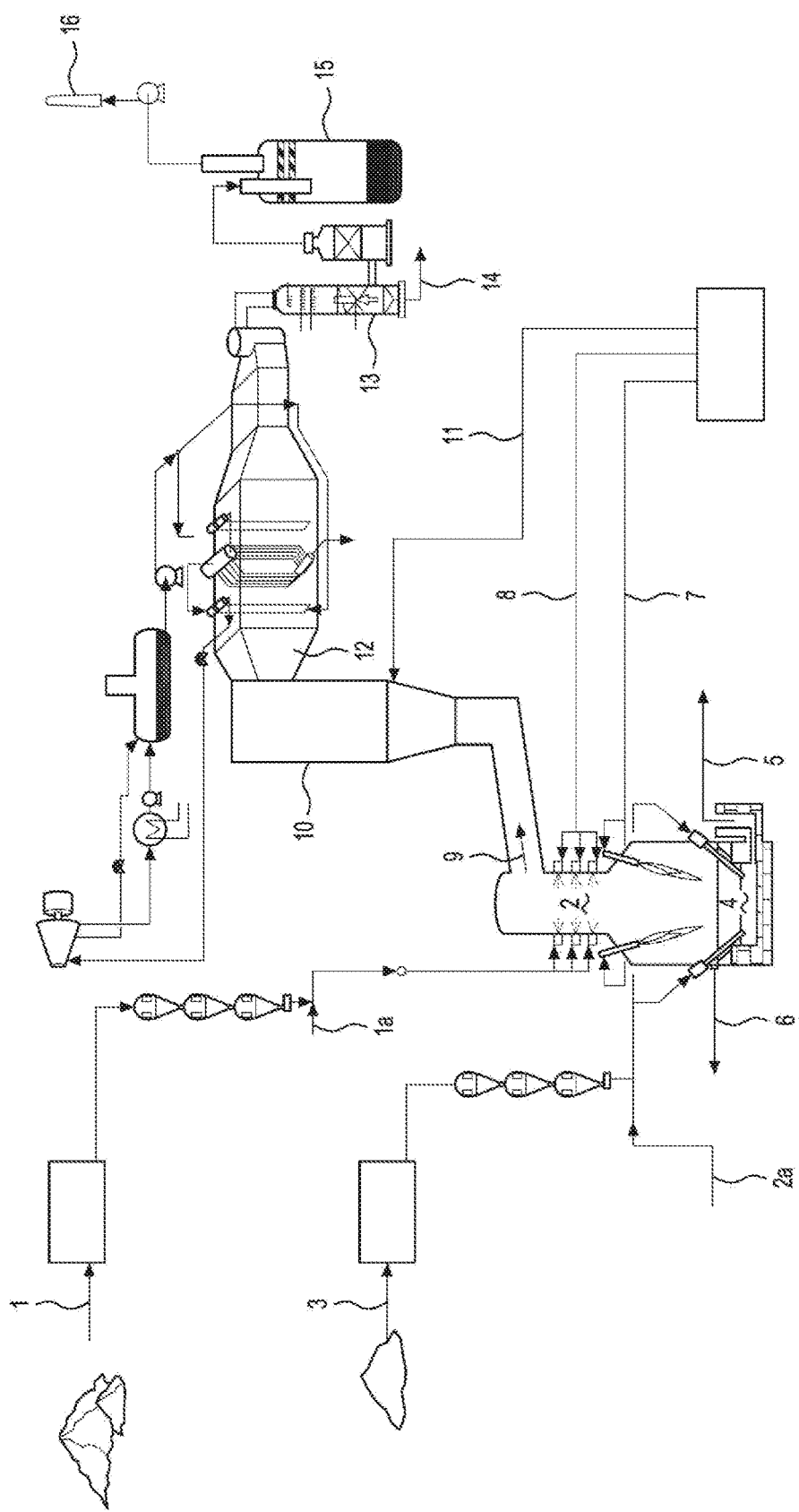
FIG. 1 is a schematic diagram which illustrates one embodiment of a plant for direct smelting iron-containing metalliferous feed material to molten iron in accordance with the HIsarna direct smelting process, with the plant including a direct smelting vessel and a smelt cyclone positioned on the vessel.

The process and the apparatus shown in FIG. 1 is an embodiment of an HIsarna process and apparatus. The process and the apparatus of the invention are not confined to the HIsarna process and apparatus and also extend to the HIsmelt and any other molten bath-based smelting process and apparatus.

The process and the apparatus shown in FIG. 1 is based on the use of an apparatus that includes a smelt cyclone 2 and a molten bath-based direct smelting vessel 4 located directly beneath the smelt cyclone 2, with direct communication between the chambers of the smelt cyclone 2 and the smelting vessel 4.

With reference to FIG. 1, a blend of metalliferous feed material in the form of magnetite-based ore (or other iron or with a top size of 6 mm and limestone 1 is fed, via an ore dryer, into the smelt cyclone 2 using a pneumatic conveying gas 1a. Limestone represents roughly 8-10 wt. % of the combined stream of ore and limestone. Coal 3 is fed, via a separate dryer, to the smelting vessel 4 where it is injected into a molten bath of metal and slag using conveying gas 2a. Oxygen 7 is injected into the smelting vessel 4 to post-combust gases, typically CO and $H_2$, generated in and released from the molten bath and provide the necessary heat for the smelting process in the bath before the gases flow upwardly from the smelting vessel 4 into the smelt cyclone 2. Oxygen 8 is injected into the smelt cyclone 2 to further combust the smelting vessel gases, resulting in very hot (cyclonic) flames in the smelt cyclone 2 that preheat and partly melt the ore. Typically, the oxygen 7 and 8 is technical-grade oxygen.

The net effect of the above-described form of the HIsarna process is a two-step countercurrent process. Metalliferous feed material is heated and partially reduced in the smelt cyclone 2 by outgoing reaction gases from the smelting vessel 4 and flows downwardly into the smelting vessel 4 and is smelted to molten iron.

Molten iron 5 is discharged from smelting vessel 4 via forehearth.

Molten slag 6 produced in the process is discharged from smelting vessel 4 via a slag tap hole.

The operating conditions, including but not limited to, coal and ore feed rates, oxygen feed rates to the direct smelting vessel 4 and the smelt cyclone 2 and heat losses from the smelting vessel 4, are selected so that offgas leaving the smelt cyclone 2 via an offgas outlet duct 9 has a post-combustion degree that is typically at least 90%.

Offgas from the smelt cyclone 2 passes via an offgas duct 9 to an offgas incinerator 10, where additional oxygen 11 is injected to burn residual $CO/H_2$ and provide a degree of free oxygen (typically 1-2%) in the fully combusted flue gas.

Fully combusted gas then passes through a waste heat recovery section 12 where the gas is cooled and steam is generated. Flue gas then passes through a wet scrubber 13 where cooling and dust removal are achieved. The resulting sludge 14 is available for recycle to the smelter via the ore feed stream 1.

Cool flue gas leaving the scrubber 13 is fed to a flue gas desulphurisation unit 15. Clean flue gas is then vented via a stack 16. This gas consists mainly of $CO_2$ and, if appropriate, it can be compressed and geo-sequestered (with appropriate removal of residual non-condensable gas species).

The smelting vessel 4 is of the type described in the about-mentioned International publication WO 00/01854 in the name of the applicant and comprises a hearth formed of refractory material and side walls extending upwardly from the sides of the hearth, with the side wall including water cooled panels. The disclosure in the International publication is incorporated herein by cross-reference.

FIGS. 2 to 5 show an arrangement of heat pipes 21 in a refractory lined hearth of a direct smelting vessel 4 of the general type shown in FIG. 1 which also includes heat pipes 21 in a section of a hearth of the vessel in accordance with one embodiment of the invention.

As is described in more detail below, in use, the heat pipes 21 significantly reduce refractory wear of the refractory material of the hearth due to contact with molten material in the form of molten slag or molten metal and make it possible to use a wider range of refractory materials in the hearth than was previously the case and obtain operational benefits as a consequence of the wider materials selection.

Figure 2:
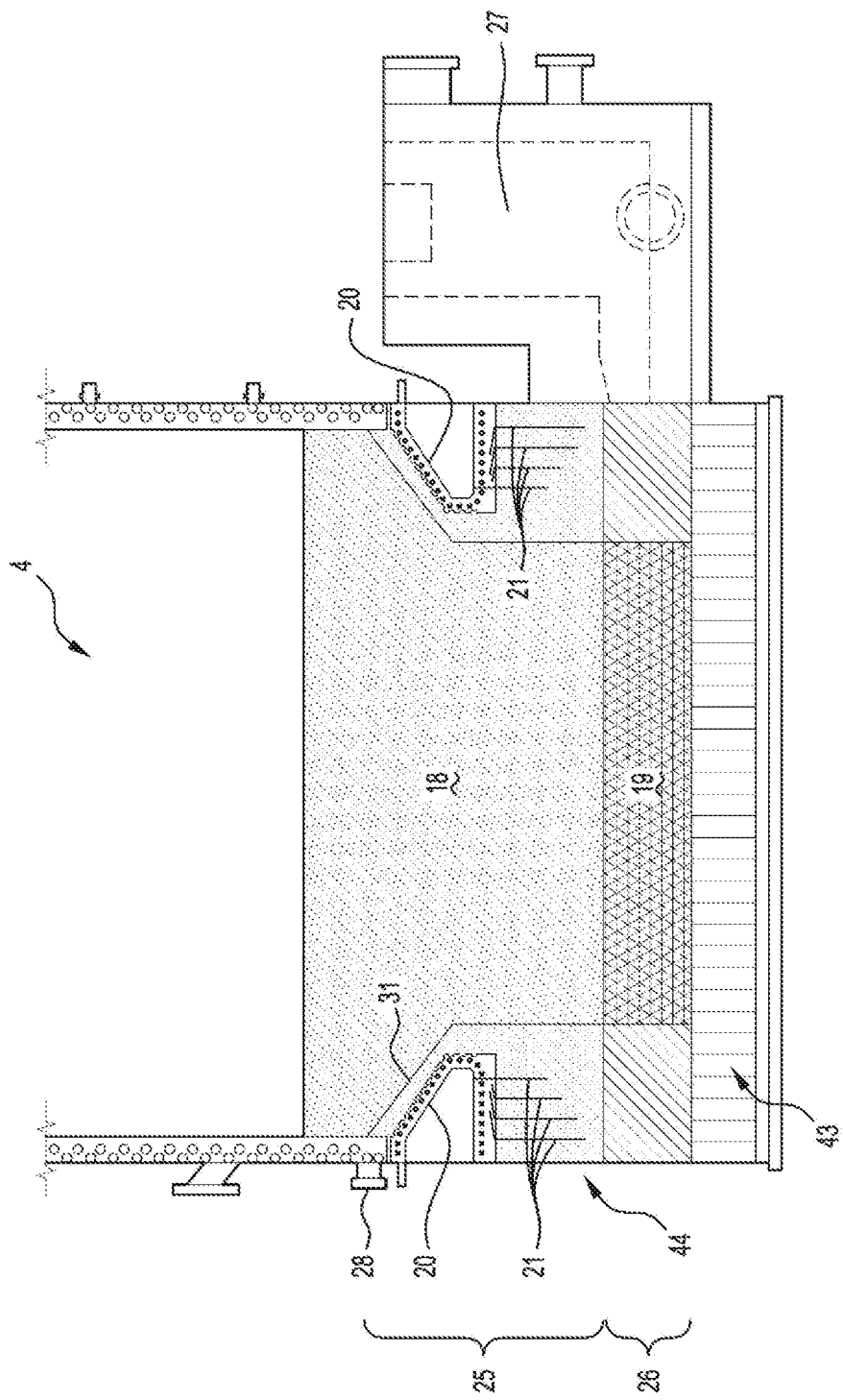
FIG. 2 is an enlargement of a lower section of part of an embodiment of a direct smelting vessel in accordance with the invention prior to the commencement of a direct smelting process in the vessel, with the Figure including the levels of molten metal and molten slag that would be in the vessel under steady state operation of the process, with the levels shown under quiescent, i.e. non-operating, conditions in the vessel.
Figure 5:
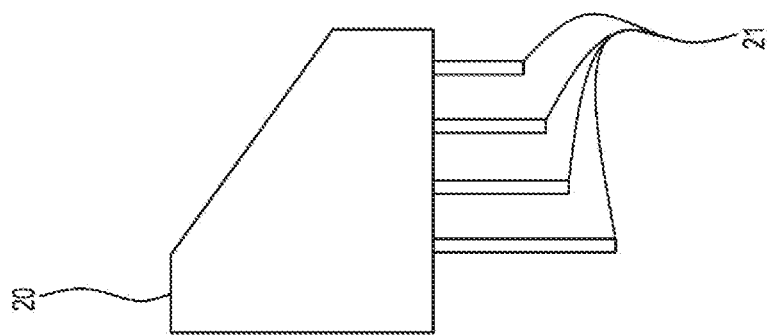
FIG. 5 is an end view of the arrangement shown in FIG. 3.
Figure 4:
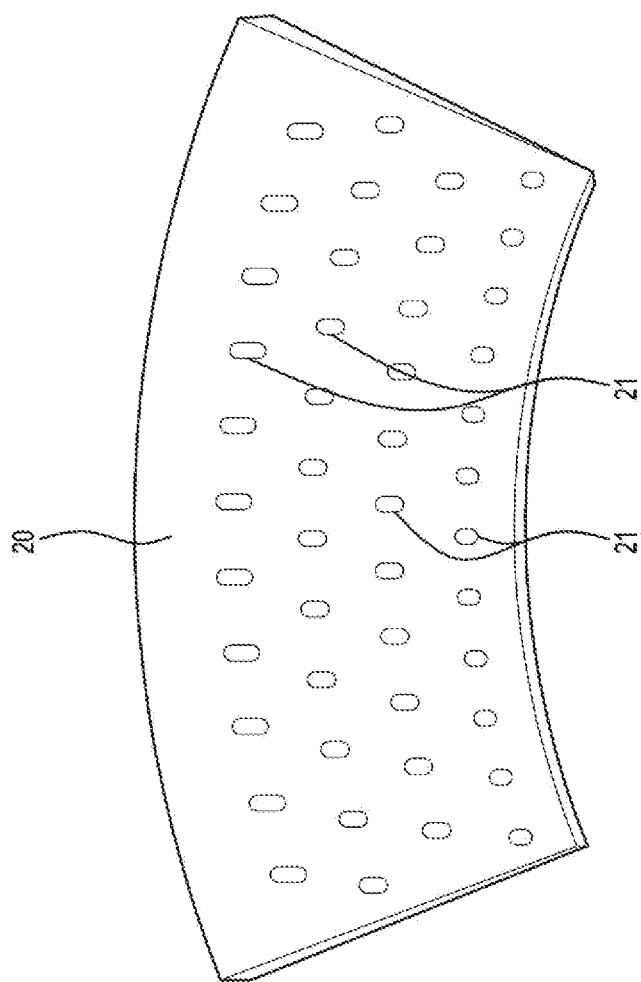
FIG. 4 is an underside view of the arrangement shown in FIG. 3.

FIG. 2 is an enlargement of a lower section of part of an embodiment of a direct smelting vessel 4 in accordance with the invention prior to the commencement of a direct smelting process in the vessel. The Figure shows the levels of molten metal and molten slag that would be in the smelting vessel 4 under steady state operation of the process, with the levels shown under quiescent, i.e. non-operating, conditions. The smelting vessel 4 may be a part of the HIsarna plant described in relation to FIG. 1 or any other direct smelting plant. FIG. 3 is a schematic perspective view that illustrates a segment of an upper section of the hearth of the smelting vessel 4 shown in FIG. 2 with the refractory material removed to show a slag zone cooler 20 and the heat pipes 21 of the embodiment. FIGS. 4 and 5 are underside and end views, respectively, of the arrangement shown in FIG. 3.

With reference to FIG. 2, the refractory lined hearth has an upper part 25 that in use is in contact with molten slag in a slag zone 18 in the vessel 4 and a lower part 26 that in use is in contact with molten metal in a metal zone 19 in the smelting vessel 4. The slag zone 18 and the metal zone 19 are shown under quiescent, i.e. non-operating, conditions. It is well understood that the slag and metal zones would be highly agitated under steady state operation of the HIsarna and HIsmelt and other molten bath-based direct smelting processes.

The hearth includes a base 43 and sides 44 that include a refractory lining in the from of refractory bricks, a forehearth 27 for discharging molten metal continuously and a tap hole 28 for discharging molten slag. The upper annular surface 31 of the hearth tapers upwardly and outwardly to the vessel side wall. In use of the vessel, this part of the hearth is exposed to splashing with molten metal and slag.

The hearth also includes:

(a) a slag zone cooler 20 positioned in the refractory lining of the upper part of the hearth for cooling the refractory lining in that part of the hearth and (b) a plurality of heat pipes 21 positioned in the refractory lining, of the upper part of the hearth below the slag zone cooler 20 for cooling the refractory lining in that part of the hearth.

The slag zone cooler 20 is as described in International publication WO 2007/134382 in the name of the applicant and the disclosure in the International publication is incorporated herein by cross-reference. The slag one cooler 20 is formed as a ring by a plurality of cooler elements. Each cooler element is shaped as a segment of the ring, with the side walls extending radially of the ring. Each cooler element comprises a hollow open backed cast shell structure having a base wall, a pair of side walls, a front wall and a top wall formed integrally in the cast shell structure and incorporating coolant flow passages for flow of coolant therethrough.

Each slag zone cooler element and the associated heat pipes in heat transfer relationship with the slag zone cooler element may be formed as an assembly that can be installed as an assembly on-site. Alternatively, the slag zone cooler elements and the heat pipes may be separately installed on site.

The refractory lining of the upper part 25 of the hearth is efficiently cooled and supported by the slag zone cooler 20. The slag zone cooler 20 significantly reduces the rate of wear of the refractory material in this part of the hearth. In particular, operation of the slag zone cooler 20 cools the refractory lining to below the solidus temperature of the molten slag in the region of the lining and causes slag to freeze onto its surface, and the frozen slag provides a barrier to further wearing of the refractory material.

The heat pipes 21 are positioned so that they do not extend out of the smelting vessel 4.

The heat pipes 21 are vertically extending parallel straight pipes. The heat pipes 21 extend downwardly vertically and parallel to each other within the upper part of the hearth from the slag zone cooler 21. The heat pipes 21 cool the refractory lining of the upper part of the hearth that below the slag zone cooler 20. The upper sections of the heat pipes 21 are in heat transfer relationship with the slag zone cooler 20 and transfer heat from the heat pipes 21 to the slag zone cooler 20. Typically, the heat pipes 21 are positioned all of the way around the hearth. The heat pipes 21 are arranged in four radially-spaced apart rings in the embodiment shown in FIGS. 2 to 5. This arrangement can best be seen in FIG. 4. The heat pipes 21 in each ring are staggered circumferentially with respect to the heat pipes 21 in the radially inward and radially outward rings of heat pipes 21. The length of the heat pipes 21 increases with radial spacing of the heat pipes 21 from an inner surface of the upper part 25 of the hearth in which the heat pipes are located.

The heat pipes 21 may be in any other suitable arrangement and orientation. By way of example, the invention is not confined to arrangements in which the heat pipes 21 are vertical. By way of further example, the invention is not confined to arrangements in which the heat pipes 21 are straight—the heat pipes 21 may include curved sections to accommodate structural features of the hearth. By way of further example, the invention is not confined to arrangements in which the length of the heat pipes 21 increases with radial spacing of the heat pipes 21 from the inner surface of the upper part 25 of the hearth.

The heat pipes 21 may be of any suitable construction. Typically, the heat pipes 21 contain water. Any other suitable heat transfer fluid at operating temperature may be used, such as alcohol, acetone or even metal as sodium.

The heat pipes 21 remove heat from the refractory material of the refractory lining. The objective of the heat pipes 21 is to maintain as large as possible a volume of the refractory material of the refractory lining in which the heat pipes 21 are positioned below the solidus temperature of the slag in the region of the refractory lining to cause slag to freeze onto the surface of the hearth and form a frozen slag layer that acts as a barrier to wear.

In a highly agitated direct smelting process, such as the HIsarna and HIsmelt processes, movement of slag and to a lesser extent molten metal in the smelting vessel 4 causes wear of the refractory material of the hearth of the smelting vessel. The wear can be of different nature such as erosion, chemical attack by FeO, $TiO_2$, and other aggressive oxides contained in the molten slag. Metal washing and splashing against the refractory material in the upper part of the hearth can also be part of the wear mechanism and enhancing a freeze lining will contribute to keep the refractory isolated from these aggressive condition causing wear. The applicant has found that, typically, molten slag flows downwardly over the upwardly and outwardly inclined upper part 31 of the hearth and then downwardly over the interior surface of the sides of the hearth. This movement progressively wears the refractory lining and forms an undercut in the refractory material.

Figure 6:
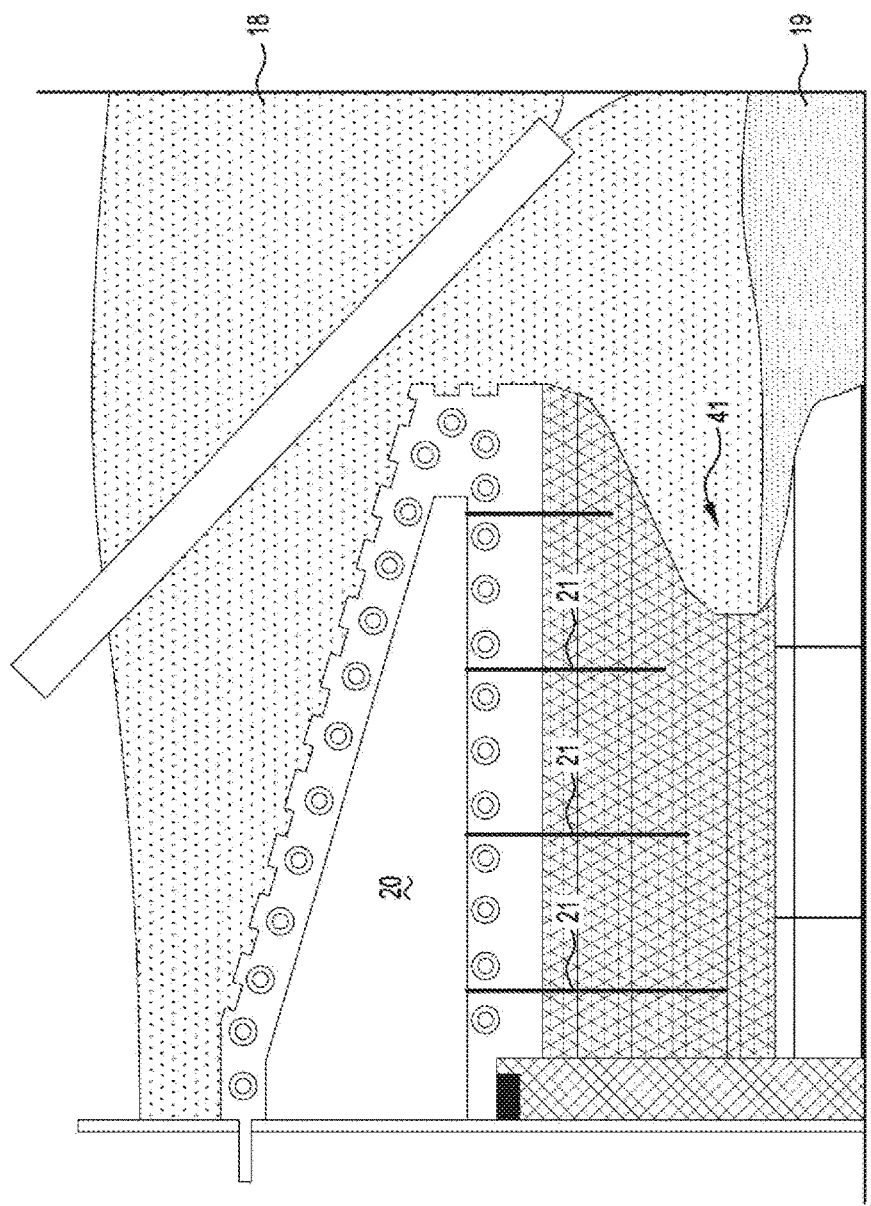
FIG. 6 is an enlargement of a lower section of part of another, but not the only other possible, embodiment off direct smelting vessel in accordance with the invention which has the same arrangement of heat pipes to that shown in FIGS. 2 to 5 and shows the lower section after the direct smelting process has been operating in the vessel for a period of time and thereby illustrates wear of the refractory material in the hearth.
Figure 7:
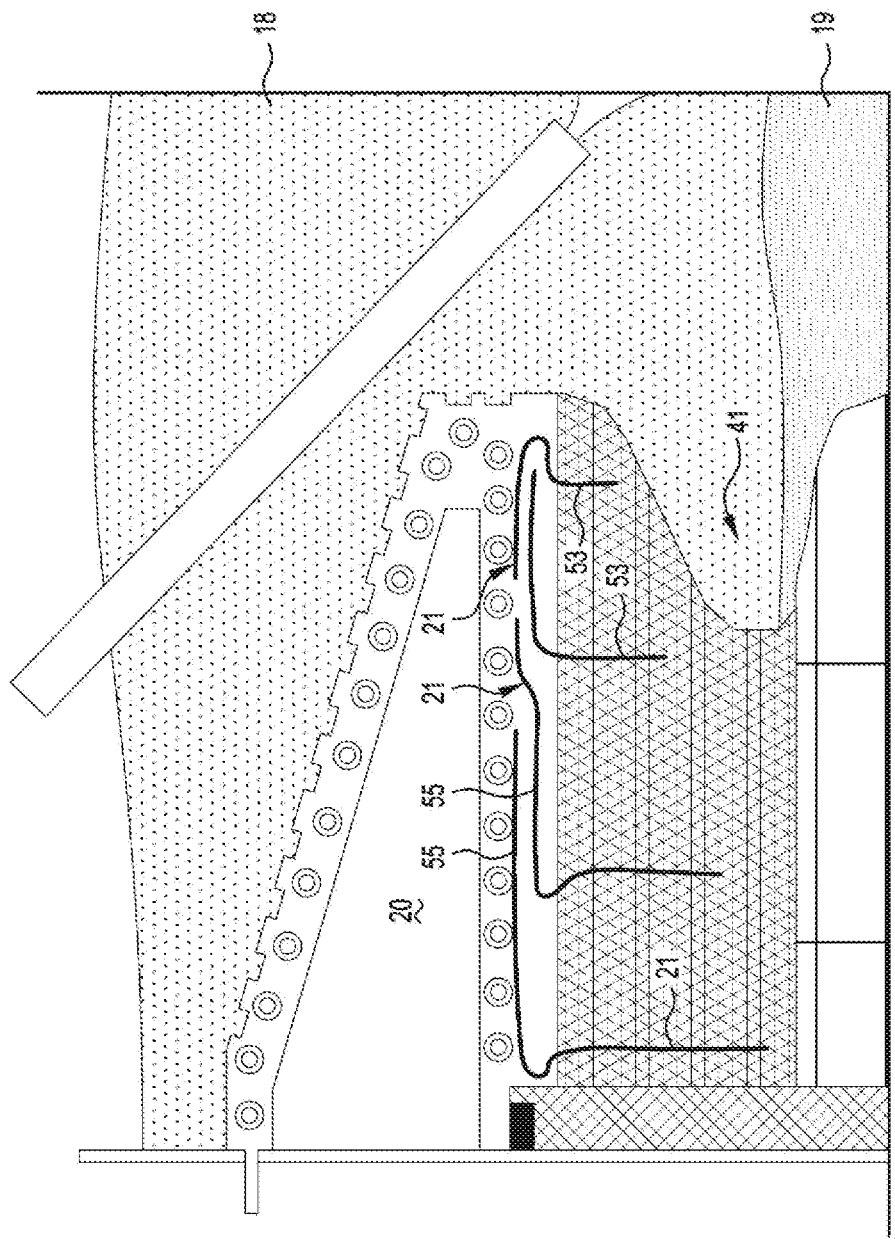
FIG. 7 is an enlargement of a lower section of part of another, but not the only other possible, embodiment of a direct smelting vessel in accordance with the invention which has a different arrangement of heat pipes to that shown in FIGS. 2 to 5 and shows the toner section after the direct smelting process has been operating in the vessel for a period of time and thereby illustrates wear of the refractory material in the hearth.
Figure 8:
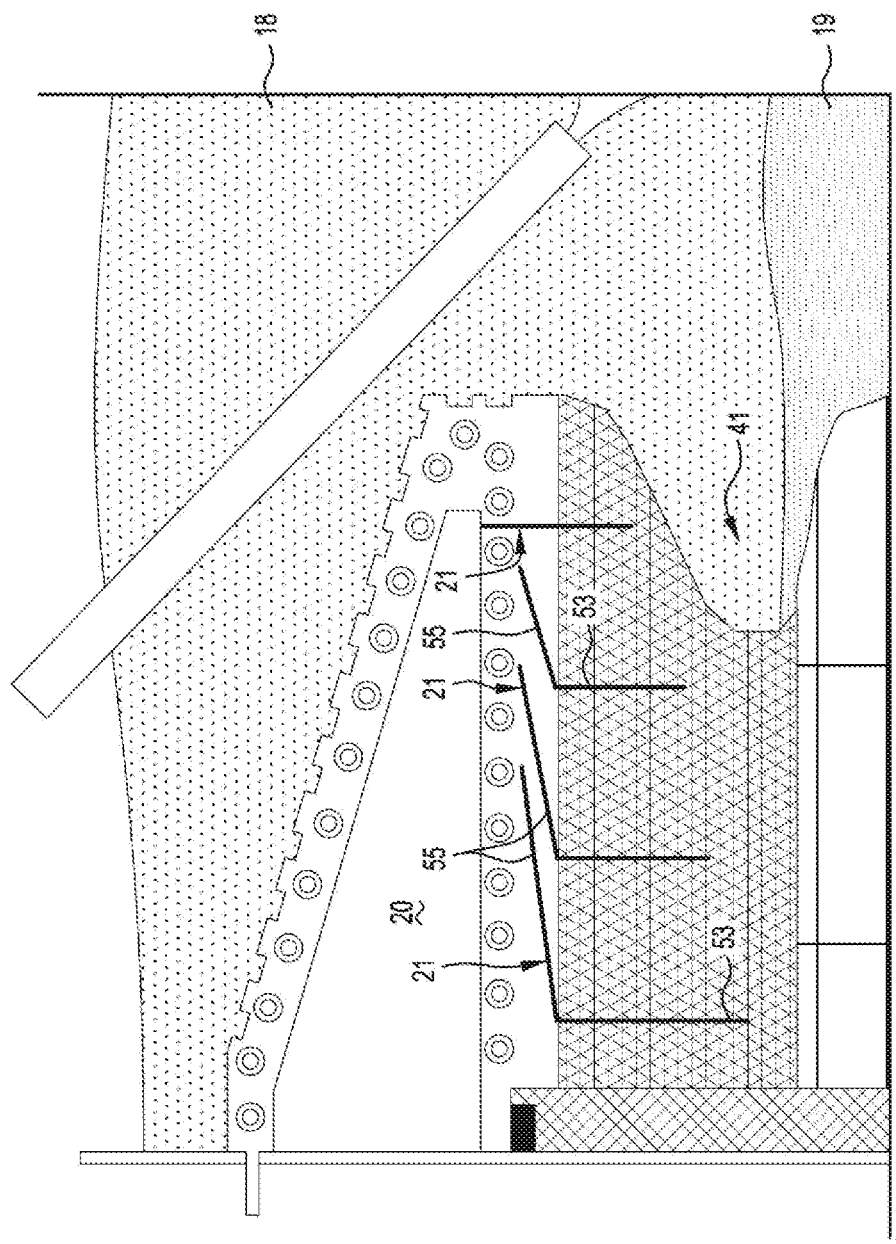
FIG. 8 is an enlargement of a lower section of part of another, but not the only other possible, embodiment of a direct smelting vessel in accordance with the invention which has a different arrangement of heat pips to that shown in FIGS. 2 to 5 and shows the lower section after the direct smelting process has been operating in the vessel for a period of time and thereby illustrates wear of the refractory material in the hearth.

This undercut wear pattern is illustrated in FIGS. 6 to 8.

FIGS. 6-8 are enlargements of lower sections of parts of other embodiments of direct smelting vessels 4 in accordance with the invention. FIG. 6 has the same basic arrangement of seat pipes 21 to that shown in FIGS. 2-5, and FIGS. 7 and 8 have similar arrangements of heat pipes 21 to that shown in FIGS. 2-5. The Figures show the smelting vessels 4 after the direct smelting process has been operating in the vessels 4 for a period of time. The Figures illustrate the undercut 41 in each refractory lining in the region of the heat pipes 21 that is the result of wear of the refractory material in the hearth.

The heat pipes 21 shown in FIG. 7 are generally inverted hockey-stick shapes, with vertically extending parallel lower sections 53 and generally radially extending upper sections 45. The heat pipes 21 shown in FIG. 8 include three generally inverted L-shapes with vertically extending parallel lower sections 53 and radially extending upper sections 55. The fourth heat pipe 21 in FIG. 8 is to straight pipe. The lower sections 53 of the heat pipes 21 in FIGS. 7 and 8 extend downwardly vertically and parallel to each other within the upper pant of the hearth below the slag zone cooler 21. The lower sections 53 cool the refractory lining of the upper part of the hearth that is below the slag zone cooler 20. The generally radially extending upper sections 55 of the heat pipes 21 are in heat transfer relationship with the slag one cooler 20 and transfer heat from the heat pipes 21 to the slag zone cooler 20. The slag zone cooler 20 extracts the heat from the smelting vessel 4. The generally radially extending upper sections 55 are positioned in close proximity to the slag zone cooler 20 and thereby facilitate the heat transfer. It is noted that the invention is not limited to these L-shaped or hockey-stick arrangements and the heat pipes 21 may be any suitable shape.

Computer simulation modeling work carried out by the applicant indicates that the extent of the wear and consequential undercut due to contact with molten slag is significantly reduced with the arrangement of heat pipes 21 shown in the embodiments of FIGS. 2-8 compared to the wear that would occur if the beat pipes 21 were not positioned in the refractory lining.

Wear of the refractory lining is a serious issue because it can significantly shorten the operating life of the smelting vessel. The design of direct smelting vessels has included the use of refractory materials that are car-resistant at the operating temperatures of the direct smelting process. In the case of smelting iron-containing feed materials refractory materials have to be wear resistant at temperatures in the range of 1400-1500° C. There is a limited group of available refractory materials that are suitable for use for the construction of hearths for direct smelting iron-containing feed materials, and these refractory materials tend to be expensive. By way of example, such refractory materials include high chrome refractory materials.

The heat pipes 21 make it, possible to maintain the refractory lining in the upper part 25 of the hearth at a lower temperature, while maintaining the effectiveness of the barriers provided by the freeze slag lining. As a consequence, the refractory lining may be made from a wider range of refractory materials than was the case previously. There are cost benefits in having access to a wider range of materials. In addition, the wider range of materials includes materials that have better thermal conductivity than the currently-used materials. The improved thermal conductivity further enhances heat removal and the refractory maintaining the refractory material below the solidus temperature of the molten slag in the region of the refractory lining.

Many modifications may be made to the embodiment of the process of the present invention described above without departing from the spirit and scope of the invention.

By way of example, whilst the embodiments include arrangements of heat pipes 21 in which the lengths of the heat pipes 21 increase with radial spacing of the heat pipes 21 from an inner surface of the upper part of the hearth in which the heat pipes are located, the present invention is not so limited and the heat pipes 21 may be of any suitable length.

By way of example, whilst the embodiments include a slag zone cooler 20, the present invention is not so limited and extends to arrangements in which there are no slag zone coolers 20. It is noted that slag zone coolers 20 of the type shown in the embodiments are a convenient option to facilitate heat transfer from the heat pipes 21 to outside the vessel 4.

By way of example, whilst the embodiments focus on contact of refractory linings with molten slag, the present invention is not so limited and also extends to situations where refractory linings are contacted by molten metal.

The invention claimed is:

1. A smelting vessel for producing molten metal including a refractory lined hearth that in use is in contact with molten slag or molten metal in the vessel, a passageway for discharging the molten metal to a forehearth, with the hearth including an upper part defined above the passageway that in use is in contact with molten slag in a slag zone in the vessel and a lower part defined up to and including the passageway that in use is in contact with molten metal in a metal zone in the vessel, with the hearth including (a) a slag zone cooler positioned in a refractory lining of the upper part of the hearth for cooling the refractory lining and (b) a plurality of heat pipes positioned in a refractory lining of the upper part of the hearth for cooling the refractory lining, and with the heat pipes being positioned in a plurality of radially spaced-apart rings completely around the hearth, wherein an upper section of each of the plurality of heat pipes are in heat transfer relationship with the slag zone cooler for transferring heat from the plurality of heat pipes to the slag zone cooler.

2. The vessel defined in claim 1 wherein the heat pipes include lower sections that extend vertically in the refractory lining.

3. The vessel defined in claim 2 wherein the lower sections of the heat pipes are curve shaped having regard to the geometry of the hearth.

4. The vessel defined in claim 2 wherein the lower sections of the heat pipes are parallel to each other.

5. The vessel defined in claim 2 wherein the lower sections of the heat pipes are spaced apart from each other.

6. The vessel defined in claim 5 wherein the spacing of the lower sections of the heat pipes is the same in one section of the hearth and different in another section of the hearth.

7. The vessel defined in claim 1 wherein the length of the heat pipes increase with radial spacing of the heat pipes from an inner surface of the upper part of the hearth in which the heat pipes are located.

8. The vessel defined in claim 1 wherein the heat pipes include upper sections that are arranged to extend radially in the vicinity of the slag zone cooler to maximize heat transfer to the slag zone cooler.

9. The vessel defined in claim 8 wherein the heat pipes are generally L-shaped or hockey-stick shaped with vertically extending lower sections and radially or generally radially extending upper sections.

10. The vessel defined in claim 1 includes a device for tapping molten metal and a device for tapping slag from the vessel, one or more than one lance for supplying solid feed materials including solid metalliferous material and/or carbonaceous material into the vessel, and one or more than one lance for supplying an oxygen-containing gas into the vessel to post-combust gaseous reaction products generated in the direct smelting process.

11. The vessel defined in claim 10 wherein the device for tapping molten metal is the forehearth.

12. The vessel defined in claim 1 includes a smelt cyclone for partially reducing and partially melting solid metalliferous material for the vessel.

13. The vessel defined in claim 1 wherein the slag zone cooler comprises a plurality of cooler elements and is formed as a ring within and extending around the circumference of the hearth.

14. The vessel defined in claim 13 wherein each cooler element comprises a hollow open backed cast shell structure having a base wall, a pair of side walls, a front wall and a top wall formed integrally in the cast shell structure and incorporating coolant flow passages for flow of coolant therethrough.

15. A process for smelting a metalliferous feed material comprising smelting the metalliferous feed material in a molten bath in the smelting vessel defined in claim 1.

16. The process defined in claim 15 includes (a) at least partially reducing and partially melting the metalliferous feed material in a smelt cyclone and (b) completely smelting the at least partially reduced/melted material in the molten bath of the smelting vessel.

* * * * *